UNITED STATES PATENT OFFICE.

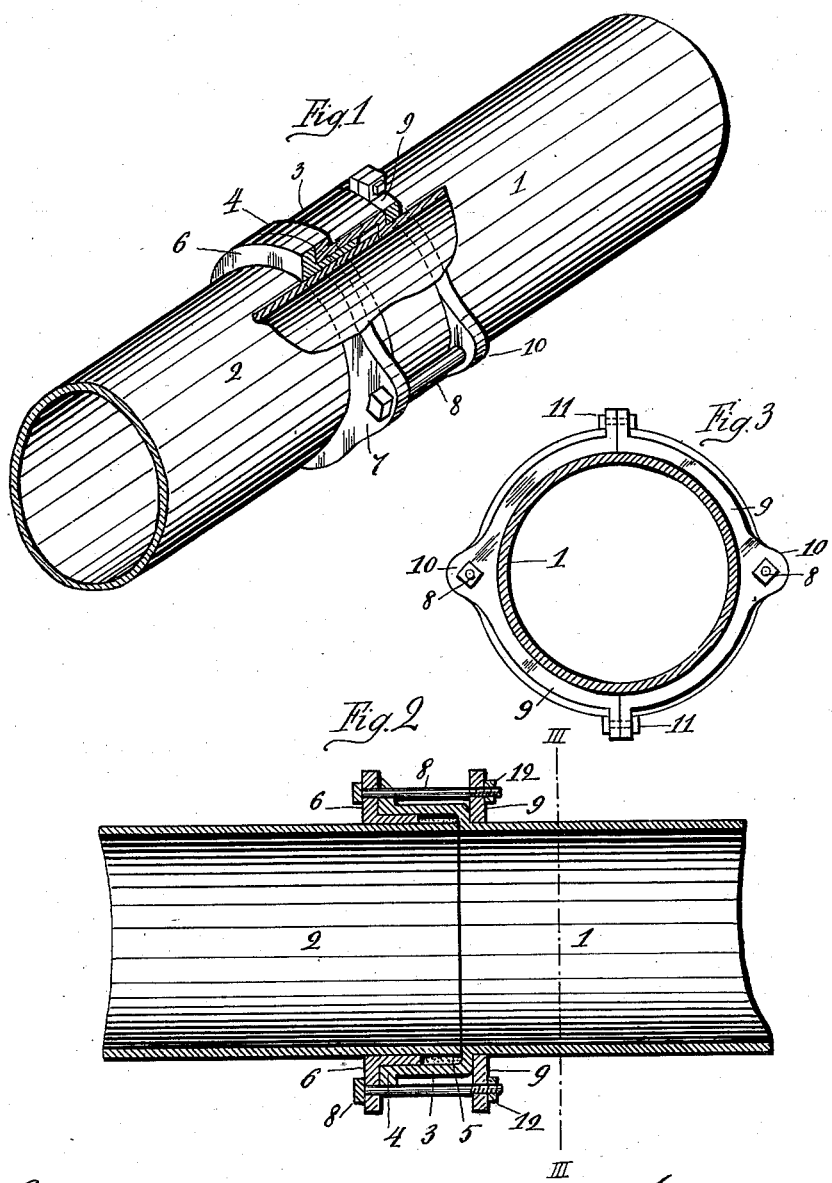

GEORGE B. CUSHMAN AND WILIAN F. CUSHMAN, OF KANSAS CITY, MISSOURI.

PIPE-COUPLING.

SPECIFICATION forming part of Letters Patent No. 655,204, dated August 7, 1900.

Application filed December 26, 1899. Serial No. 741,611. (No model.)

*To all whom it may concern:*

Be it known that we, GEORGE B. CUSHMAN and WILIAN F. CUSHMAN, of Kansas City, Jackson county, Missouri, have invented certain new and useful Improvements in Pipe-Couplings, of which the following is a specification.

Our invention relates to improvements in pipe-couplings and aims to provide a coupling for use in connection with pipes for the transmission of steam, water, or other fluid which shall be absolutely secure against leakage and also not liable to become disconnected from accidental causes.

In the accompanying drawings, Figure 1 is a perspective view of two sections of pipe connected together by means of our coupling, a portion of the joint being broken away to show the parts in section. Fig. 2 is a central longitudinal section through the coupling in the plane of the connecting-bolts. Fig. 3 is a transverse section on the line III III of Fig. 2 looking toward the joint.

1 and 2 designate, respectively, the faucet and spigot ends of two sections of pipe. The pipe 1 has the ordinary flange or shoulder 3 and also an additional flange 4 extending outwardly from the margin of flange 3, space being provided between said flanges and pipe 2 for the packing 5 and for the insertion of the gland 6. Said gland consists of a cylindrical portion embracing the pipe and a flanged portion extending radially therefrom. Said flanged portion is provided at diametrically-opposite points with radially-projecting lugs 7, through which pass bolt-holes to receive bolts 8, connecting the flange of the gland with a divisible ring 9, encircling pipe 1 on the opposite side of the joint and abutting against the outer shoulder of flange 3. Said ring 9 is provided with lugs 10, corresponding to those on the gland 6, through which the bolts 8 pass, and is preferably made in two sections connected by bolts, as shown in Fig. 3. The packing 5 may be of any preferred material.

In adjusting the coupling the gland-section 6 is placed over the end of pipe 2 and the ring 9 over pipe 1. The end of pipe 2 is then inserted within the shoulder of pipe 1 and the packing 5 inserted in the space between them. The gland 6 is then driven in against the packing and firmly connected by bolts 8 and nuts 12 with the ring 9, which is made to abut firmly against the outer shoulder of flange 3.

The construction described embodies a packing which is easy of adjustment, economical in construction, and practically proof against leakage.

We claim as our invention and desire to secure by Letters Patent—

In a pipe-coupling, the combination of the flanged shoulder 3 on the faucet portion of the pipe, a gland 6 between said shoulder and the spigot portion of the adjacent pipe, said gland having an annular flange; a divisible ring 9 mounted on said faucet portion and abutting against said shoulder, projecting lugs 10 on said ring, projecting lugs 7 on the flange of said gland, bolts 8 passing through said lugs and connecting said flange with said ring, and a packing-ring 5, substantially as described.

In testimony whereof we affix our signatures in the presence of two witnesses.

GEORGE B. CUSHMAN.
WILIAN F. CUSHMAN.

Witnesses:
F. A. SPENCER,
M. L. LANGE.